United States Patent [19]

Carroll et al.

[11] Patent Number: 5,280,077
[45] Date of Patent: Jan. 18, 1994

[54] PROCESS FOR THE SYNTHESIS OF OLIGOMERIC VINYLAMINES

[75] Inventors: William E. Carroll, Orefield; Robert K. Pinschmidt, Jr., Allentown, both of Pa.

[73] Assignee: Air Products and Chemicals, Inc., Allentown, Pa.

[21] Appl. No.: 913,563

[22] Filed: Jul. 14, 1992

[51] Int. Cl.⁵ .................. C08F 18/22; C08F 20/54
[52] U.S. Cl. .................. 525/328.2; 526/303.1
[58] Field of Search .................. 526/303.1; 525/328.2

[56] References Cited

U.S. PATENT DOCUMENTS

| | | | |
|---|---|---|---|
| 4,018,826 | 4/1977 | Gless, Jr. et al. | 260/583 |
| 4,146,690 | 3/1979 | Tago et al. | 526/303.1 |
| 4,154,910 | 5/1979 | Tanaka et al. | 526/303.1 |
| 4,808,683 | 2/1989 | Itagaki et al. | 526/303.1 |
| 4,940,760 | 7/1990 | Boettcher et al. | 526/303.1 |
| 4,952,656 | 7/1990 | Lai et al. | 525/328.2 |
| 5,037,927 | 8/1991 | Itagaki et al. | 526/303.1 |

FOREIGN PATENT DOCUMENTS 53-127586 11/1978 Japan ................. 526/303.1
53-127587 11/1978 Japan ................. 526/303.1

OTHER PUBLICATIONS

"Solid-State Polymerization of Acrylamide and Its derivatives complexed with Lewis Acids" Orszagh et al, Journal of Polymer Science: Polymer Chemistry Edition vol. 1 No. 2 (Feb.) pp. 363-369 (1981).
Chemistry of Organic Compounds, Noller, pp. 233-235 Oct. 1, 1956.

*Primary Examiner*—Joseph L. Schofer
*Assistant Examiner*—N. Sarafim
*Attorney, Agent, or Firm*—Mark L. Rogers; William F. Marsh; James C. Simmons

[57] ABSTRACT

Vinylamide oligomers and lower molecular weight polymers are prepared by the cationic polymerization of vinylamides in the presence of a Lewis acid at a temperature between $-100°$ and $100°$ C. The resultant vinylamide oligomers and polymers can optionally be hydrolyzed under acidic or basic conditions to form the corresponding vinylamine oligomers and polymers.

12 Claims, No Drawings

PROCESS FOR THE SYNTHESIS OF OLIGOMERIC VINYLAMINES

FIELD OF THE INVENTION

The present invention relates to the polymerization of vinylamides to form oligomers which can be hydrolyzed to form the corresponding oligomeric vinylamines.

BACKGROUND OF THE INVENTION

Oligomeric materials containing primary amine groups are desirable in numerous applications, particularly coatings, adhesives and curatives for epoxy, isocyanate, aminoplast and other reactive systems. Preparation of low molecular weight or oligomeric primary amine containing polymers has previously been impossible even using the desired precursor monomer N-vinylformamide. Even with use of large amounts of chain transfer agents suitably low molecular weights could not be achieved.

Polymerization of N-vinylformamide (NVF) has been widely reported under free radical conditions to give high molecular weight homo and copolymers. Polymers containing mixtures of primary, secondary and tertiary amine groups (e.g., polyethyleneimine) or oxidatively unstable ethyleneamines (mainly secondary, with terminal primary amines) have been prepared by other routes and used previously.

Vinylamine polymers with molecular weights from 3,000 to 6.7 million have been reported. U.S. Pat. No. 4,018,826 discloses the preparation of poly(vinylamine) salts of mineral acids by polymerizing vinylacetamide with a free radical polymerization catalyst and hydrolyzing the polymer to the desired amine salts by contacting the p-vinylacetamide with an aqueous solution of the corresponding mineral acid. Poly(vinylamine) product of about 3,000 to about 700,000 molecular weight (4000 to about 1,000,000 for the salt product) is suggested. U.S. Pat. No. 4,952,656 discloses polymerization of NVF to extremely high molecular weight polymers above 3 MM using inverse emulsion conditions. NVF polymers and copolymers have the unusual ability to be hydrolyzed easily under acid or base conditions to the corresponding polyvinylamine, giving polymers with highly reactive primary amine groups or, when protonated, high levels of cationic charge. Such materials have numerous applications as curatives in coatings and adhesives, for papermaking, water treatment, enhanced oil recovery, for personal care polymers, in biomedical applications and in mineral recovery. To prepare free radical polymers, it is well known that oxygen and other radical inhibitors Must be removed in order to allow the radical chains to grow, consuming the monomer, without excessive use of expensive initiators. The resulting polymers are also rather high in molecular weight, 600,000 to 2 million under bulk polymerization techniques for vinylamide monomers. Such polymers are highly viscous and difficult to process, even in solution (typically in water, one of the few good solvents for poly-N-vinylformamide (PNVF) or poly-vinylamine (PVAm)). For many applications it is desired to have very low molecular weight polymer, e.g., to give low viscosities or better miscability and solubility, or in reactive systems to give moderate crosslink densities that prevent the system from becoming too brittle. This is typically done with free radical polymerizations with the addition of chain transfer agents, such as dodecanethiol, bromotrichloromethane, or isopropanol. Such agents add unwanted cost and co- or by-products (such as halogens) to the polymer and result in unwanted high polydispersity or too high molecular weights. Unreacted chain transfer agents are also difficult to remove from the mixture.

Alternatively, the free radical polymerization may be run by delay feeding monomer and/or at high dilution in a solvent. This option gives poor kettle utilization, requires the use of much solvent which may be expensive, toxic or hard to remove and, with MVF, still gives polymers with molecular weights in the 50,000 range at reasonable (10%) monomer levels. Running the polymerization at high temperature with excess initiator, particularly with the delay feeds as described above, is not suitable because of the low thermal stability of NVF in the condensed phase and its tendency to auto decompose to colored byproducts. The added initiator is also a significant cost factor.

In addition to free radical polymerization, amine and formamide containing polymers have been made via other means, such as the condensation of ethylene glycol and ammonia, ethanolamine or ethylenediamine or combinations of these compounds at high temperatures in the presence of a catalyst to give polyethylenepolyamines. Such materials give complex mixtures with mainly secondary and tertiary amines and numerous cyclic, substituted piperazine structures. Such materials have limited thermal and oxidative stability and frequently have color problems. Similar materials can be made using ethylenedichloride and ammonia or ethylenediamine, along with a base. These materials produce significant salt byproducts and may also give some quaternary nitrogens.

Polymerization of aziridine produces highly branched polyamines with nearly equal quantities of primary, secondary and tertiary nitrogens. In addition to the problems cited for condensation reactions, the monomer is highly toxic, carcinogenic and explosive.

German Patent Application DE 4030-380-A discloses an anionic N-vinylformamide polymerization process using a basic catalyst to form primarily an NVF dimer and an oligomer with a hydrolytically unstable nitrogen containing backbone.

SUMMARY OF THE INVENTION

The present invention is a cationic polymerization (or cationically initiated polymerization) process for the synthesis of vinylamide oligomers and lower molecular weight polymers. Vinylamide monomeric units are reacted in the presence of a Lewis acid catalyst, optionally in the presence of a solvent, at a temperature between −100° C. and 100° C. to form the corresponding vinylamide oligomer or polymer. The ability to cationically polymerize vinylamides to form oligomer and lower molecular weight polymers is unexpected in view of the failure of other prior art polymerization processes to make such products. The resultant vinylamide oligomers and polymers formed by this process can subsequently be hydrolyzed under acidic or basic conditions to form the corresponding vinylamine oligomers or polymers. This process is especially useful for synthesizing oligomers of N-vinylformamide and N-vinylacetamide which can be hydrolyzed to form the corresponding vinylamine oligomers which exhibit unusual water sensitivity and rapid solution, as well as high reactivity, uniformity and light and color or stability.

DETAILED DESCRIPTION OF THE INVENTION

We have found that N-vinylamides can be cationically polymerized at moderate to subambient temperatures using Lewis acid catalysts. The N-vinylamides can be polymerized neat, or optionally in the presence of an inert solvent such as ethers, alkanes, chloroalkanes, aromatics, mixtures thereof and the like. The cationic polymerization can be carried out over a wide range of temperatures, generally from about −100° C. to 100° C., and preferably from about 0° to 50° C. In carrying out the polymerization, the heat of reaction should be removed at a rate equal to or greater than the rate of heat production in order to prevent thermal runaway of the reaction. Polymerization under these conditions produces relatively low molecular weight (e.g. typically between about 600 and 2,500) vinylamide oligomers or polymers. The specific product molecular weight depends upon monomer concentration, catalyst type and level and temperature.

The cationic polymerization is carried out using Lewis acid catalysts, i.e., compounds that can accept a pair of electrons, including Bronsted acids (i.e., compounds with high hydrogen ion donating capabilities), strong acid ion exchange resins, $AlCl_3$, $SnCl_4$, $BF_3$, chlorides, fluorides and other halides of Groups IIA, IIB, IIIA, IIIB, IVA, IVB, VB and VII elements such as aluminum, boron, antimony, tin, arsenic, iron, zinc, titanium, magnesium and silicon. These may also be advantageously present (4,009,129) as coordination complexes with organic compounds containing donor atoms such as oxygen, e.g., ethers, such as $BF_3 \cdot Et_2O$. Additional possibilities are the oxyacids of sulfur, phosphorus, halogens and arsenic and the hydrogen halides such as HCl and HBr. Organic sulfonic acids, such as methanesulfonic, trifluoromethanesulfonic acid, etc.; organic derivatives of phosphorus oxyacids; and some carbon acids such as formic and trifluoroacetic acid are possibilities. Acid oxides, such as acidic alumina acidic zeolites and clays should also be effective catalysts for the reaction. Well known examples of cationic initiator Lewis acids are set out in U.S. Pat. Nos. 3,139,098; 5,070,117 and 4,009,129. A large number of compounds are also known which generate catalytically effective groups for cationic polymerization on activation with light (U.S. Pat. Nos. 3,196,098; 4,009,129; 4,575,544; 4,096,056 and references therein) or under redox conditions (U.S. Pat. No. 4,192,924). The catalyst level in the reaction may vary from about 0.001 mol %, to 10 mol %.

In preferred embodiments, the vinylamide monomer used in the reaction is either N-vinylformamide (NVF) or N-vinylacetamide (NVA) although other vinylamides can be used, such as derivatives of NVF including N-alkyl and N-alkoxyalkyl vinylformamide, as well as other higher vinylamides. Two or more different vinylamides can also be used in the reaction to form a co-oligomer or copolymer. In addition to the use of several different vinylamides, cationic polymers of vinylamides with other cationically polymerizable monomers can be synthesized with this process. Examples of such other cationically polymerizable monomers include vinyl ethers, styrene, α-methylstyrene, isobutylene and other multiply alkyl substituted olefins. In such copolymerization reactions, mole ratios from 99:1 to 1:99 can be used with a preferred range being from 1-70 moles % NVF with 30-99% of cationically copolymerized monomer or mixtures of monomers.

The product of bulk polymerization of NVF is a hard, brittle solid which is highly soluble in water. Powdered product is in fact highly hygroscopic. The product can be dissolved to over 50% solids with quite low viscosity and can be readily hydrolyzed under acid or base conditions to give low molecular weight p-vinylamine or its acid salts. It shows nmr spectra essentially identical to those of typical free radical polymerized material.

Most prior work with vinylamide polymerization has used tertiary amides which are much less likely to coordinate with the catalyst and deactivate it. Work with NVF itself has shown it to be highly unstable in the presence of acids and to undergo particularly facile degradation and hydrolysis with acid or base. It is surprising that polymerization can be done in a controlled manner and that the product is a colorless to slightly colored product if the heat evolution can be controlled. The ability to prepare extremely low MW oligomers is not readily available via other means and the resulting extremely low MW oligomers in the hydrolyzed and unhydrolyzed forms are themselves unique polymers (oligomers) not available by other means and with reactivity and properties unlike previously known materials. It is anticipated that the presence of air is not seriously detrimental to the cationic polymerization, raising the possibility that this technology may have particular value in coatings and adhesives cured in-situ in an oxygen containing environment.

This form of polymerization allows one to prepare low molecular weight product. The extreme reactivity of this vinylamide apparently is enough to allow the cationic polymerization process to occur usefully rapidly in comparison to chain transfer and termination. The product can be used as the p-formamide or hydrolyzed to the primary amine polymers which are not available by other means.

It is anticipated that these polymers, hydrolyzed, partially hydrolyzed or unhydrolyzed, can be used as components of adhesives, binders, tie layers and coatings and as water soluble polymers in water treatment, papermaking, petroleum and mineral recovery, personal care and biomedical markets. Particular opportunities may be found in lube oil additives, detergents for fuels, curatives and curative precursors for isocyanate, aminoplast, anhydride, epoxide, aziridine, acetylacetate, Michael adduct and other reactive cure systems in adhesives, binders, coatings and bulk polymers. Utility of the materials in photoresist applications in microelectronics is also anticipated. They should be of interest as scavengers of metals, acids, aldehydes and ketones. The high water solubility suggests uses as humectants and components in super-absorbents. They can also be pre-reacted with a wide variety of functionalities, i.e., the above plus alkyl halides, esters and aldehydes to give derivative low molecular materials for use in coatings (e.g., cathodic electrocoat), adhesives, binders and other applications.

The following examples are presented to better illustrate the present invention and are not meant to be limiting.

EXAMPLES

Example 1

Reaction of NVF with $SnCl_4$.

A 19×65 mm vial was equipped with a small magnetic stirring bar, septum cap, thermocouple, syringe needles as $N_2$ inlet and outlet, and an ice bath. To this was added 2 mL of 95?,, NVF. The sample was cooled to 5° C. and treated with a small amount of $SnCl_4$ (Aldrich Chemical Co.). Several additions of small droplets of tin chloride produced little temperature rise and the bath was removed. Small additional amounts of catalyst were added (total≈0.2 ML) and the temperature climbed slowly to 36° C., whereupon the vial was placed in a water bath. The sample turned slightly yellow and showed some small particles or bubbles and slowly became more viscous. After 14 hrs the sample was a brittle glassy solid which was highly soluble in water or DMSO, but precipitated in MEOH (picks up moisture and dissolves on removal of MEOH). $^1H$ nmr in DMSO-$d_6$ showed the expected peaks at δ7.9, 3.7 and 1.4 ppm for PNVF. Small amounts of unreacted NVF monomer were also present.

Example 2

Reaction of NVF with $SnCl_4$ - larger scale

To 10 g of NVF in a 25 ML flask equipped as above was added 0.1 mL of $SnCl_4$ at 0.8° C. After 5 min the sample was transferred to a water bath at 21° C. The sample was maintained at 21°-28° C. for 25 hr and became viscous and orange in color. On heating in a 52°-55° C. bath, the sample increased to 72° C. and then cooled to bath temperature over 2.5 hr. The orange brittle solid was highly soluble in water and on gpc analysis in water gave a broad peak in the range of 2500 and 975 MW polyethylene glycol (PEG) standards, tailing to lower MW. NMR analysis again showed PNVF with a little formamide.

Example 3

Reaction of NVF with $BF_3 \cdot Et_2O$

Using the setup of Example 1, but substituting somewhat less than 0.1 mL of $BF_3 \cdot Et_2O$ (Aldrich) at 11° C., the temperature rose to 17° C. and dropped back. The sample was allowed to react in a water bath at 23°-270° C. Over 30 min the sample became very thick; overnight the sample became a nearly colorless brittle solid. The sample formed an over 50 wt % solution in water with modest viscosity. GPC analysis after neutralizing the sample showed several peaks, mainly low molecular weight (longer retention time) than 975 MW PEG. Nmr showed PNVF.

Comparison Example 3

Reaction $BF_3 \cdot Et_2O$ without Temperature Control.

The procedure of Example 3 was removed from the ice bath and allowed to warm. After 2 min the reaction rapidly increased in temperature to 139° C., turning dark orange/red and giving off enough gas to blow off the septum.

Example 4

Reaction of NVF with Strong Acid (sulfonic Acid Ion

N-vinylformamide, 2 mL (95%) was placed in a 13 mL vial in an insulated foam block. A 1/16" dia. thermocouple was use to follow temperature. Approx. 30 small beads of Rohm and Haas A-15 macroreticular strong acid ion exchange resin were added. The temperature was monitored with occasional stirring and climbed from 25° C. to 86° C. over about 1 hr. The beads darkened, but the monomer color remained good and the sample thickened considerably. Three days later the sample was very hard and adhered tightly to the thermocouple.

Comparison Example 4

Control Reaction of NVF with Strong Acids without Temperature Control

N-vinylformamide, 2mL (95%) was placed in a 13 mL vial in an insulated foam block. A 1/16" dia. thermocouple was used to follow temperature and stir the mixture. One drop of sulfuric acid was added to the vial, giving a rapid temperature rise to 70° C. The temperature remained at 55°-65° C. for 30-50 sec, then rose over 15 sec to 170° C., accompanied by darkening of the solution and smoke and gas evolution. Similar results were obtained with one drop of concentrated HCl.

Example 5

Hydrolysis of PNVF

To approximately 1.3 g of the example 3 product in 3 mL of water was added 1.43 g (18.3 mmol) of 50% NAOH. the sample became warm, solids formed and redissolved. The hydrolysis was followed by titrating small aliquots with HCl, indicating slow reaction after an initial 50% fast reaction. The next day the sample was beated 2 hr at 600° C. and 3 hr at 80° C. The sample was treated with conc HCl to precipitate the hydrochloride salt, but only a small amount of solid precipitated. Cooling precipitated additional solids and concentration gave somewhat yellow brittle foam.

Example 6

Polymerization of NVF in Diethyl Ether

To a 100 mL 3-neck flask equipped with a large magnetic stirrer, nitrogen blanket, ice bath, thermocouple and reflux condenser was added 50 ml of fresh anhydrous $Et_2O$ and 20.2 g of NVF. The solution was cooled to 7.6° C. and about 0.28 mL of $BF_3 \cdot Et_2O$ was added slowly without a noticeable temperature change. The ice bath was replaced with a water bath. No exotherm was noted, but the solution became turbid and sticky solids began to form after 20 min. The sample was allowed to react overnight in the water bath to give a hard, but slightly spongy solid (ether had largely evaporated). The material dissolved in water with agitation to a low viscosity solution.

Example 7

Copolymerization of NVF with Butyl Vinyl Ether

To a 4 dram vial with magnetic stir bar, septum cap and nitrogen inlet and exit needles was added 1.3 mL of butyl vinyl ether and 0.7 ML of NVF (1:1 molar ratio). The sample was cooled to 5.60° C. and treated with a few small drops of $BF_3 \cdot Et_2O$. A momentary 2 mL temperature rise was noted, but reaction was slow even at 23° C. and a total of 0.2 mL of $BF_3 \cdot Et_2O$ was added. The reaction was easily controlled by a water bath at 23°-30° C. and increased in viscosity and became murky and slightly yellow over 1 hr. After 16 hr the product was a hard waxy solid. Addition of a small amount of water gave a small lower layer and a hazy yellow upper layer. The top layer was largely soluble in hexanes, while the bottom was not. $^1$H NMR (CD$_3$OD): δ8.0, 3.95, 3.45, 1.9-1.3, 1.1, 0.9 ppm; the hexane soluble layer had relatively low δ8.0, 3.95, 1.9-1.3 peaks, indicating lower incorporation of NVF, while the less hexane soluble fraction was rich in these signals, indicating higher NVF incorporation. Clearly polymer was formed in high yield, but composition drift was observed.

Having thus described the present invention, what is now deemed appropriate for Letters Patent is set out in the following appended claims.

We claim:

1. A cationic polymerization process for the synthesis of-N-vinylformamide oligomers and polymers comprising contacting-N-vinylformamide monomeric units in the presence of a Lewis acid catalyst at a temperature between −100° and 100° C.

2. The process of claim 1 wherein said Lewis acid catalyst is present in a concentration of from 0.001 mol % to 10 mol % based upon the reaction mixture.

3. The process of claim 1 wherein said cationic polymerization is carried out in the presence of an inert solvent.

4. The process of claim 3 wherein said inert solvent is selected from the group consisting of ethers, alkanes, chloroalkanes, aromatics and mixtures thereof.

5. The process of claim 1 wherein said Lewis acid catalyst is also a Bronsted acid.

6. The process of claim 1 wherein said Lewis acid is selected from the group consisting of a strong acid ion exchange resin, AlCl$_3$, SnCl$_4$ and BF$_3$·Et$_2$O.

7. The process of claim 1 wherein N-vinylformamide monomeric units are contacted in the reaction with other cationically polymerizable monomers to form a co-oligomer or copolymer of said monomer units.

8. The process of claim 7 wherein said other cationically polymerizable monomers are selected from the group consisting of vinyl ethers, styrene, (a-methyl)styrene, isobutylene and alkyl-substituted olefins.

9. The process of claim 1 wherein the resultant N-vinylformamide oligomer or polymer is subsequently hydrolyzed to form the corresponding vinylamine oligomer or polymer.

10. The process of claim 1 wherein the resultant N-vinylformamide oligomer or polymer is partially hydrolyzed to form a vinylamide/vinylamine oligomer or polymer.

11. The process of claim 7 wherein the resultant co-oligomer or copolymer is subsequently hydrolyzed.

12. The process of claim 7 wherein the resultant co-oligomer or copolymer is subsequently partially hydrolyzed.

* * * * *